United States Patent Office 3,161,659
Patented Dec. 15, 1964

3,161,659
AZIDOAMINOBORANES
Herbert C. Newsom, Whittier, Calif., assignor to United States Borax & Chemical Corporation, Los Angeles, Calif., a corporation of Nevada
No Drawing. Filed Aug. 17, 1962, Ser. No. 217,259
6 Claims. (Cl. 260—349)

This invention relates to novel azidoaminoboranes, and more particularly, this invention relates to the new compounds, bis(dialkylamino)azidoboranes.

The object of this invention is to provide as new compositions, novel bis(dialkylamino)azidoboranes.

A further object of this invention is to provide facile methods for preparing said bis(dialkylamino)azidoboranes.

Other objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated the present invention comprises bis(dialkylamino)azidoboranes having the formula

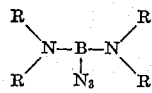

where R is an alkyl group of one to six carbon atoms. Examples of suitable groups represented by R include methyl, ethyl, propyl, n-butyl, pentyl and n-hexyl.

The bis(dialkylamino)azidoboranes have utility as a component of propellant systems, blowing agents in polymerization processes, polymerization catalysts, and chemical intermediates.

The compounds of this invention are readily prepared by reaction of the corresponding bis(dialkylamino)haloborane with an inorganic azide such as lithium azide, as illustrated by the following equation:

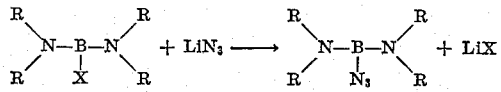

where X represents a bromo or chloro radical and R represents a lower alkyl group having one to about six carbon atoms. Preferably, equimolar amounts of the reactants are used so as to obtain best yields of the desired product. Any of the other well known inorganic azides such as sodium azide, potassium azide, etc., are equally applicable to the present process.

The reaction takes place at elevated temperatures, such as about 75° C. to 125° C., with good yields of the desired product. Preferably, the reaactants are heated in a inert liquid medium so as to maintain efficient control of the reaction temperature. Hydrocarbons such as toluene and xylene are examples of suitable liquid media. The desired product can be isolated and purified by conventional procedures. For example, the solvent is removed by distillation under pressure and the residue then distilled to give the purified product.

The intermediate halo-bis(dialkylamino)boranes can be prepared by the reaction of boron trichloride or boron tribromide with a dialkylamine as described by Brotherton et al., J. Amer. Chem. Soc. 82, 6242–45 (1960).

The compounds are normally high-boiling liquids having surprisingly good heat stability. Since they are readily hydrolyzed, they should preferably be kept in a dry atmosphere, avoiding contact with water or alcohols.

The following example illustrates the preparation of a representative compound of this invention, but is not to be considered to be limiting the invention to the specific example given herein.

I

Bis(dimethylamino)chloroborane, 4.86 grams (0.0362 mole), and 1.77 grams (0.0362 mole) of lithium azide were stirred in 50 ml. of refluxing toluene for 48 hours. The solid material was removed by filtration under nitrogen and then washed with 20–40° C. petroleum ether. The combined filtrate and washings were distilled under reduced pressure to first remove the solvent and then give 3.28 grams of clear, colorless liquid at 38–42° C./2 mm. Redistillation of the product through an 8 inch spiral wire column gave the purified bis(dimethylamino)azidoborane, B.P. 60.5° C./14 mm.–64° C./12 mm.

Calculated for $C_4H_{12}BN_5$: B=7.68%; C=34.10%; H=8.59%. Found in product: B=7.77%; C=33.96%; H=8.62%.

Heating the liquid for 2 hours at 150° C. and then at 180° C. gave no observable gas evolution. However, heating in a sealed wall ampoule at 250° C. for 3 hours resulted in apparent decomposition with gas evolution.

Thus, it is apparent that the compound has very good heat stability at temperatures up to about 180° C. This is unexpected in view of the known instability of azides and overcomes a great disadvantage of the common organic azides.

Other compounds which can be prepared in a similar manner are:

Bis(diethylamino)azidoborane
Bis(dipropylamino)azidoborane
Bis(dibutylamino)azidoborane
Bis(dipentylamino)azidoborane
Bis(dihexylamino)azidoborane Other modes of applying the principle of the invention may be employed, change being made as regards the details described, provided the features stated in any of the following claims or the equivalent of such be employed.

I, therefore, particularly point out and distinctly claim as my invention:

1. A bis(dialkylamino)azidoborane of the formula

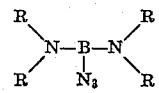

where R is alkyl of one to six carbon atoms.

2. Bis(dimethylamino)azidoborane.

3. The method of preparing a bis(dialkylamino)azidoborane which comprises reacting at an elevated temperature a bis(dialkylamino)haloborane and an inorganic azide.

4. The method of claim 3 in which said reaction takes place at a temperature of about 75° C. to about 125° C.

5. The method of claim 3 in which said inorganic azide is lithium azide.

6. The method of preparing bis(dimethylamino)azidoborane which comprises reacting at an elevated temperature bis(dimethylamino)chloroborane and lithium azide.

No references cited.